(12) United States Patent
Okigami (10) Patent No.: US 7,263,724 B2
(45) Date of Patent: Aug. 28, 2007

(54) UNAUTHORIZED USAGE MONITORING SYSTEM FOR IMAGE FORMING APPARATUS

(75) Inventor: Masafumi Okigami, Souraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 655 days.

(21) Appl. No.: 09/974,418

(22) Filed: Oct. 10, 2001

(65) Prior Publication Data

US 2002/0042881 A1   Apr. 11, 2002

(30) Foreign Application Priority Data

Oct. 10, 2000   (JP) .............................. 2000-309342

(51) Int. Cl.
G06K 9/00   (2006.01)
(52) U.S. Cl. .......................... 726/32; 726/31; 382/112
(58) Field of Classification Search ................ 713/200; 726/26, 32
See application file for complete search history.

(56) References Cited

U.S. PATENT DOCUMENTS

| | | | | |
|---|---|---|---|---|
| 5,077,795 A | * | 12/1991 | Rourke et al. ................ 380/55 |
| 5,610,688 A | | 3/1997 | Inamoto et al. | |
| 5,671,277 A | * | 9/1997 | Ikenoue et al. ............. 713/179 |
| 5,673,373 A | * | 9/1997 | Nosaki et al. .............. 358/1.15 |
| 5,798,844 A | * | 8/1998 | Sakano et al. ............... 358/405 |
| 5,802,260 A | * | 9/1998 | Shimakawa et al. ....... 358/1.15 |
| 5,822,083 A | * | 10/1998 | Ito et al. ..................... 358/403 |
| 5,978,619 A | * | 11/1999 | Kato et al. ................... 399/80 |
| 6,081,897 A | * | 6/2000 | Bersson ........................ 726/32 |
| 6,144,835 A | * | 11/2000 | Inoue et al. ................ 399/366 |
| 6,166,826 A | * | 12/2000 | Yokoyama ................. 358/1.16 |
| 6,282,687 B1 | * | 8/2001 | Maeda et al. ............... 714/763 |
| 6,307,640 B1 | * | 10/2001 | Motegi ...................... 358/1.14 |
| 6,313,921 B1 | * | 11/2001 | Kadowaki .................. 358/1.15 |
| 6,362,893 B1 | * | 3/2002 | Francis et al. ............. 358/1.14 |
| 6,384,928 B2 | * | 5/2002 | Nagasawa et al. ......... 358/1.15 |
| 6,545,767 B1 | * | 4/2003 | Kuroyanagi ............... 358/1.14 |
| 6,546,313 B2 | * | 4/2003 | Nakahira et al. ........... 700/224 |
| 6,606,163 B1 | * | 8/2003 | Suzuki et al. .............. 358/1.15 |
| 6,608,692 B1 | * | 8/2003 | Shibahara et al. ......... 358/1.13 |
| 6,618,566 B2 | * | 9/2003 | Kujirai et al. ................ 399/79 |
| 6,641,312 B1 | * | 11/2003 | Chang et al. ................. 400/76 |
| 6,707,954 B1 | * | 3/2004 | Akamatsu et al. .......... 382/298 |
| 6,807,388 B1 | * | 10/2004 | Kojima et al. ................ 399/80 |
| 6,862,583 B1 | * | 3/2005 | Mazzagatte et al. .......... 705/64 |

(Continued)

FOREIGN PATENT DOCUMENTS

JP   04-196751   7/1992

(Continued)

*Primary Examiner*—Nasser Moazzami
*Assistant Examiner*—David Garcia Cervetti
(74) *Attorney, Agent, or Firm*—David G. Conlin; David A. Tucker; Edwards Angell Palmer & Dodge LLP (57) ABSTRACT

When a digital copier is used, for monochrome images, image data is stored into a storage in association with user ID codes at a 5% possibility while for color images, image data is stored in association with user ID codes at possibilities ranging from 0 to 50% depending upon the users. For storing image data the data is reduced then the reduced data is stored. This makes it possible to reduce the amount of data to be stored and hence enables use of a reduced capacity of storage, which makes easier the management for reading the content in the storage and discerning unfair usage of the digital copier.

6 Claims, 5 Drawing Sheets

U.S. PATENT DOCUMENTS

| | | | |
|---|---|---|---|
| 6,864,991 B1 * | 3/2005 | Takahashi | 358/1.15 |
| 6,912,059 B1 * | 6/2005 | Takahashi | 358/1.15 |
| 6,914,691 B1 * | 7/2005 | Sato | 358/1.15 |
| 6,940,615 B1 * | 9/2005 | Shima | 358/1.15 |
| 6,945,717 B2 * | 9/2005 | Hata et al. | 400/76 |
| 6,952,726 B1 * | 10/2005 | White et al. | 709/224 |
| 7,002,707 B2 * | 2/2006 | Kujirai | 358/1.9 |
| 7,057,772 B1 * | 6/2006 | Bannai | 358/3.01 |
| 7,079,278 B2 * | 7/2006 | Sato | 358/1.15 |
| 7,143,291 B1 * | 11/2006 | Shibata | 713/182 |

FOREIGN PATENT DOCUMENTS

| | | |
|---|---|---|
| JP | 05-095453 | 4/1993 |
| JP | 10-262129 | 9/1998 |

* cited by examiner

| Monochrome | 0.05 |
|---|---|
| Color | 0.50 |

| User ID | Color need | |
|---|---|---|
| ...... | ...... | ......... |
| 04567 | 0.60 | Suzuki |
| ...... | ...... | ......... |
| 05678 | 0.90 | Takahashi |
| 06789 | 0.30 | Yamamoto |
| ...... | ...... | ......... |
| 12345 | 0.00 | Tanaka |
| ...... | ...... | ......... |

FIG. 6

UNAUTHORIZED USAGE MONITORING SYSTEM FOR IMAGE FORMING APPARATUS

BACKGROUND OF THE INVENTION (1) Field of the Invention

The present invention relates to an unauthorized usage monitoring system for image forming apparatus for monitoring an unfair use of image forming apparatus for recording images, text, etc., onto recording paper.

(2) Description of the Prior Art

Recently, there are many offices and the like in which terminals such as personal computers are linked via a network to image forming apparatus such as digital multi-functional machines, forming a networked system. The image forming apparatus may function as a printer which receives print data via the network from a terminal and records images, text, etc., represented by the print data onto recording paper, or may work as a copier for reading an original image and recording the image onto recording paper.

Though the image forming apparatus of this type markedly contributes to improvement in work efficiency in the office, the apparatus is often unduly used for private business as opposed to official tasks.

Incidentally, Japanese Patent Application Laid-Open Hei 10 No. 262129 discloses a 'telephone accounting management system' in which private calling of a user from the system is suppressed by having registered a list of telephone numbers of business counterparts beforehand, comparing the calling number when a phone call is made from the phone to the public line, with the above list so as to determine whether the calling is to an official business counterparts or of a private use, thus discerning the private use of the phone.

However, the above image forming apparatus system has no means to check whether the image forming apparatus has been used for official business or unduly used for private business, so has no way of suppressing unfair use of the machine.

SUMMARY OF THE INVENTION

The present invention has been devised in view of the above problem, it is therefore an object of the present invention to provide an unauthorized usage monitoring system for image forming apparatus which is able to inhibit unfair use of the image forming apparatus.

In order to achieve the above object, the present invention is configured as follows:

In accordance with the first aspect of the present invention, an unauthorized usage monitoring system for image forming apparatus, includes: an identifying means which, when data recording onto recording paper is performed by an image forming apparatus, identifies the ID code of a user who requested to record the data; and a storage means for storing at least part of the recorded data in association with the ID code identified by the identifying means, wherein the image forming apparatus records onto recording paper the image data transferred from a networked user terminal or shared document server connected thereto.

In accordance with the second aspect of the present invention, the unauthorized usage monitoring system for image forming apparatus having the above first feature is characterized in that the identifying means is provided at least one of the image forming apparatus and the storage means is provided for a monitoring server connected with the image forming apparatus via the network.

In accordance with the third aspect of the present invention, the unauthorized usage monitoring system for image forming apparatus having the above first feature is characterized in that the data recorded on recording paper is compressed and the compressed data is stored in the storage means.

In accordance with the fourth aspect of the present invention, the unauthorized usage monitoring system for image forming apparatus having the above first feature further comprises: a judgement means for determining whether at least part of data should be stored or not, wherein only when the judgement means has determined that data should be stored, at least part of the data is stored in association with the ID code into the storage means.

In accordance with the fifth aspect of the present invention, the unauthorized usage monitoring system for image forming apparatus having the above fourth feature is characterized in that when data is for color imaging, the judgment means determines whether at least part of the color data should be stored or not by comparing a random number with a predetermined storage ratio for color imaging, and when data is for monochrome imaging, the judgment means determines whether at least part of the monochrome data should be stored or not by comparing a random number with a predetermined storage ratio for monochrome imaging.

In accordance with the sixth aspect of the present invention, the unauthorized usage monitoring system for image forming apparatus having the above fourth feature is characterized in that the judgment means holds multiple storage ratios in association with multiple ID codes, selects one storage ratio corresponding to the ID code which has been identified by the identifying means and determines whether at least part of the data should be stored, based on the selected storage ratio.

In accordance with the seventh aspect of the present invention, the unauthorized usage monitoring system for image forming apparatus having the above first feature further comprises: a determining means for determining whether data is shared by multiple users, wherein the data which has been determined by the determining means to be shared by multiple users will not be stored.

In accordance with the eighth aspect of the present invention, the unauthorized usage monitoring system for image forming apparatus having the above first feature further comprises: a pattern detecting means for detecting a preset pattern attached to data, wherein the data from which the pattern is detected by the pattern detecting means will not be stored.

According to the present invention thus configured, at least part of recorded data is stored in association with user ID codes into the storage means. Therefore, it is possible to know who recorded what kind of data by reading out the stored content from the storage means, thus making it possible to discern unfair use of the image forming apparatus and inhibit this.

According to another aspect of the present invention, each image forming apparatus has an identifying means. That is, if there are a multiple number of image forming apparatus, each machine has its identifying means while the storage means may be provided for a single monitoring server to which each image forming apparatus is connected via a network. Therefore, if data is recorded by any of the image forming apparatus, at least part of the recorded data is stored in association with its ID code into the monitoring server by data transfer between each image forming apparatus and the monitoring server.

Further, according to the present invention, since the data is compressed and then stored into the storage means, it is possible to reduce the storage capacity of the storage means. For data compression, reduction, thinning or the like can be used.

In the present invention, if, for example, the criterion for monitoring unfair use of an image forming apparatus varies depending on the type of data, the judgement means determines whether at least part of data should be stored or not, based on the monitoring criterion corresponding to the type of data. This makes it possible to reduce the amount of data to be stored into the storage means and hence enables use of a reduced capacity of storage means, which makes easier the management of storage content in the storage means.

According to the present invention, judgement as to whether at least part of data is stored is made by making a distinction between monochrome data and color data. Since the cost for recording color data onto recording paper is higher than that for monochrome data, the storage ratio for color imaging is set higher than that for monochrome imaging. That is, color images are adapted to be stored into the storage means at higher possibilities than monochrome images so as to discern unfair use of the image forming apparatus more closely as to color image recording.

According to the present invention, it is judged whether at least part of data should be recorded for each ID code or each user. As the storage ratio depending on the ID code becomes higher, the possibility that the data is stored into the storage means becomes higher hence the criterion for monitoring unfair use of the image forming apparatus becomes more severe.

According to another aspect of the present invention, the data shared by multiple users is assumed to be not private and will not be stored. This makes it possible to reduce the amount of data to be stored into the storage means, and hence enables use of a reduced capacity of storage means, which makes easier the management of storage content in the storage means.

According to the present invention, data for official business is added with a predetermined pattern so as to avoid the official data being stored. This reduces the amount of data to be stored into the storage.

DESCRIPTION OF THE PREFERRED EMBODIMENTS

The embodiment of the present invention will hereinafter be described in detail with reference to the accompanying drawings.

Figure 1:
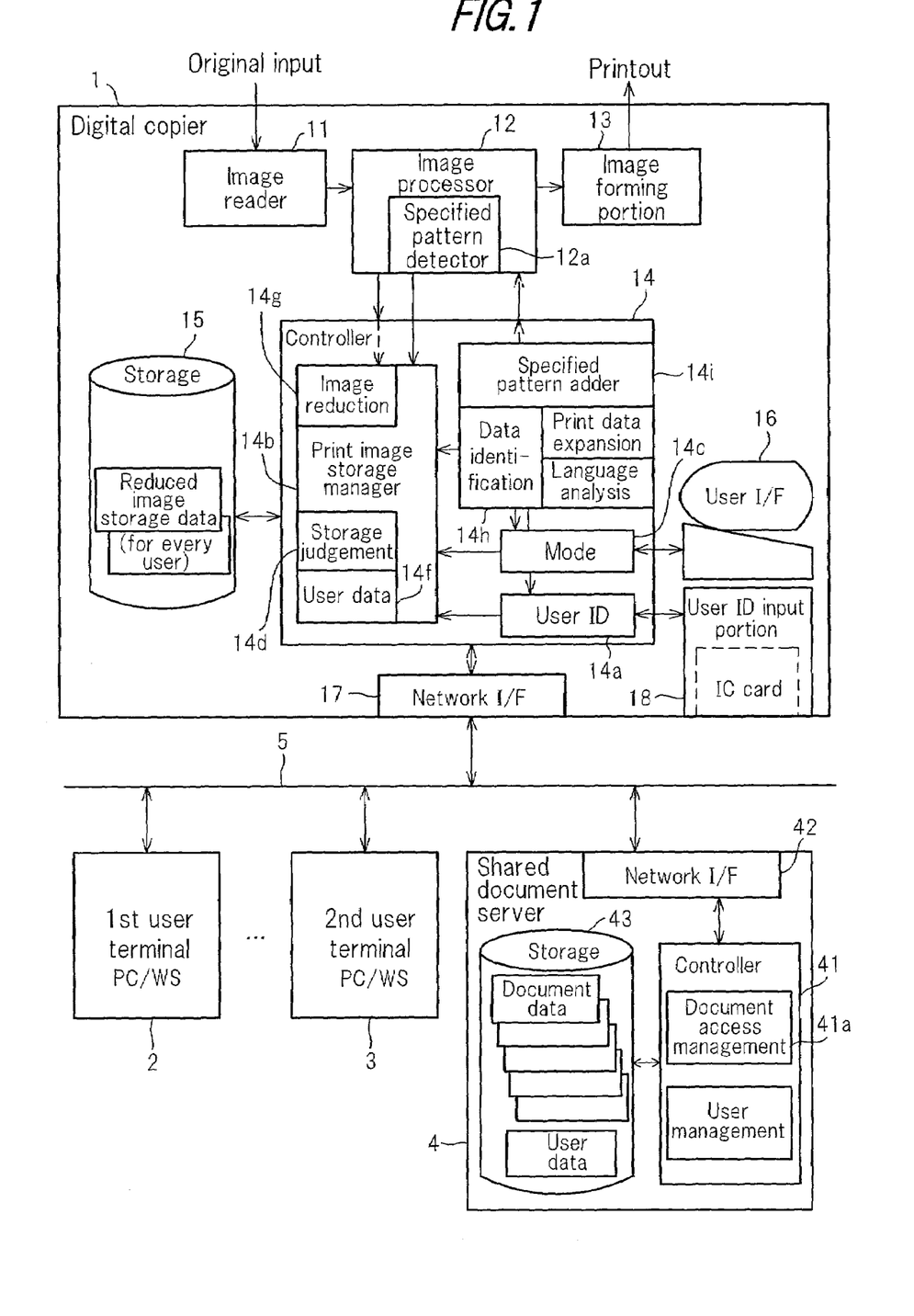
FIG. 1 is a block diagram showing a network system to which one embodiment of the unauthorized usage monitoring system of the present invention is applied.

FIG. 1 is a block diagram showing a network system to which one embodiment of the unauthorized usage monitoring system of the present invention is applied. The network system shown in FIG. 1 is used in an office, and is comprised of a digital copier 1 having copier and printer functions, first and second user terminals 2 and 3, etc., such as personal computers, workstations and a shared document server 4 interconnected to each other on a network 5. Digital copier 1 may function as a copier and as a printer which receives image data from first and second terminals 2 and 3 or from shared document server 4 and records the images represented by the image data onto recording paper.

When digital copier 1 is used as a copier, an image document is set on an image reader 11 and it is instructed to duplicate the document image by operating the input control portion 16. A controller 14, in response to this, actuates image reader 11 in order to copy the image of the document. Image reader 11 reads the original image and generates image data representing this image and outputs it to an image processor 12. Image processor 12 subjects the image data to various processes and outputs the processed image data to an image forming portion 13. Image forming portion 13 records the image presented by this image data onto recording paper and discharges the recording paper.

Digital copier 1 is able to duplicate both monochrome and color images. For duplicating an original image onto recording paper, either monochrome or color imaging should be selected by operating input control portion 16 when a copy command is made. When color imaging is selected, image data for color imaging is output from image reader 11 and then processed through image processor 12, so that the color images are recorded on recording paper.

When digital copier 1 is used as a printer, image data representing images, text etc., is transferred from the first user terminal 2, for example, to digital copier 1 via network 5. Controller 14 of digital copier 1 receives the image data through a network I/0 device 17 and outputs this data to image processor 12. Image processor 12 subjects the image data to various processes and outputs the processed image data to Image forming portion 13. Image forming portion 13 records the image presented by this image data onto recording paper.

Alternatively, when a recording request of an image data is given from the second user terminal 3 to shared document server 4 via network 5, controller 41 of shared document server 4 receives this request by way of a network I/O device 42 and actuates a document access manager 41a. This document access manager 41a searches storage 43 for this image data and transfers the image data to digital copier 1 via network 5. Digital copier 1 receives this image data via network I/O device 17 and supplies it to image processor 12 via controller 14. The image data is processed through image processor 12, then is input to image forming portion 13. This image forming portion 13 records the image represented by this image data onto recording paper.

When the copier functions as a printer, both monochrome and color images can also be obtained. Therefore, designation of either monochrome or color imaging should be given from the terminal (first or second user terminal 2 and 3, or shared document server 4) to digital copier 1.

Since this digital copier 1 has both copier and printer functions, this apparatus is markedly effective in improving work efficiency in the office. However, the machine may be used unduly for private business other than intended tasks. To deal with this, the machine of this embodiment includes unauthorized usage monitoring system components (discussed in detail below) that execute the processing sequence of the flowchart shown in FIG. 2 in parallel when it functions as a copier, so that at least part of the image data will be stored in association with the ID code of the user of the digital copier 1. Similarly, when the machine functions as a printer, the unauthorized usage monitoring system components of this embodiment execute the processing sequence of the flowchart in FIG. 3 in parallel, so that at least part of the image data will be stored in relation to the ID code of the user. In this way, when at least part of the image data has been stored in relation to the user ID code, it is possible to, at any time, know who recorded what kind of data when using the digital copier. That is, it is possible to identify a user who used the digital copier 1 unduly and give them warning so as to inhibit unfair use.

Next, the processing sequence of the flowchart shown in FIG. 2 when digital copier 1 functions as a copier will be described.

Upon copying, the user first inserts an ID card (not shown), which has been given beforehand, into an user ID input portion 18 of digital copier 1. This user ID input portion 18 is waiting for an ID card to be inserted (Step S1, not inserted). Once an ID card is inserted (Step S1, inserted), the ID code of the user is read from this ID card and is output to controller 14. An user ID portion 14a of controller 14 receives the ID code and compares it with the previously stored ID code (Step S2). If the new ID code does not agree with the previous ID code (Step S2, different), this ID code is stored while the pervious ID code is deleted so as to renew the ID code (Step S3). If the new ID code agrees with the previous ID (Step S2, same), Step S3 is skipped. Then, user ID portion 14a passes the ID code of the ID card to a print image storage manager 14b.

Thereafter, the original image is set in image reader 11 and input control portion 16 is operated so as to give an order for copying the original image with designation of monochrome imaging, for example. When a copying command is given (Step S4, given) and monochrome image copying is designated (Step S5, No), a mode portion 14c of controller 14 gives notice to perform a copying operation of monochrome imaging to print image storage manager 14b, image reader 11, image processor 12 and image forming portion 13.

In response to this, image reader 11 reads the image of the original and outputs the image data representing the monochrome image. This image data is processed through image processor 12 and then supplied to image forming portion 13, where the monochrome image is reproduced on recording paper.

Image processor 12 outputs the image data also to print image storage manager 14b of controller 14. Further, a specified pattern detector 12a of image processor 12 tries to detect the certification pattern previously involved in the image data. If the certification pattern is detected from the image data, this certification pattern is output to print image storage manager 14b of controller 14.

Figure 4:
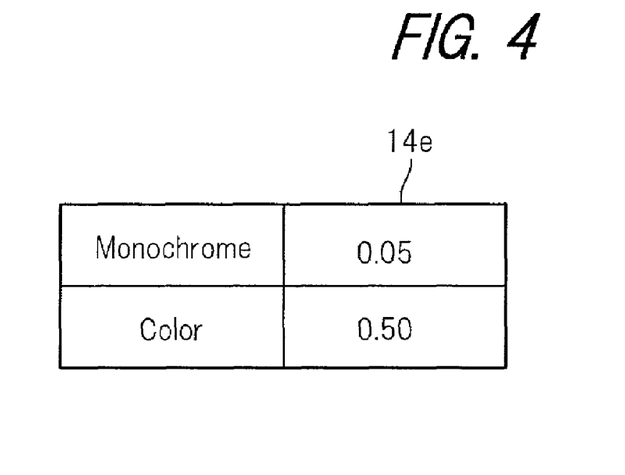
FIG. 4 is a chart showing a table of basic storage ratios in the system of the embodiment.

A storage judgement portion 14d of print image storage manager 14b, in response to the notice of a copying operation of monochrome imaging from mode portion 14c, determines a storage ratio for monochrome imaging (Step S8). To determine this storage ratio, storage judgement portion 14d refers to a basic storage ratio data table 14e shown in FIG. 4. In this basic storage ratio data table 14e, the basic storage ratio for monochrome imaging is registered to be 0.05 and the basis storage ratio for color imaging is to be 0.50. Storage judgement portion 14d reads out the basic storage ratio for monochrome imaging, 0.05, from basic storage ratio data table 14e, and generates, at random, a random number RDN, whose values are varied in 0.01 increments within the range of 0 to 1.00 and compares the generated random number with 0.05, the basic storage ratio for monochrome imaging (Step S9). If the random number RDN<the basic storage ratio, 0.05 holds (Step S9, Yes), the operation goes to Step S10, in order to store the image data representing the monochrome image. When the random number RDN<the basic storage ratio, 0.05 does not hold (Step S9, No), the operation returns to Step S1 without storing the image data. As a result, the storage ratio of monochrome images is set at 5% of all the copied monochrome images.

When the random number RDN<the basic storage ratio, 0.05 holds (Step S9, Yes) hence the operation is followed by the process from Step 10, an image reducing portion 14g of print image storage manager 14b performs reduction of the image data from image processor 12 (Step S10). This reducing process can be done by any one of the existing methods of reducing images, for example, by the most simple process or by decimating pixels of the image, appropriately.

When specified pattern detector 12a of image processor 12 detects the certification pattern from the image data (Step S11, detected) in the course of reducing the image, this fact is informed to image reducing portion 14g, which in turn stops the reduction process upon the image data (Step S12). This is because, as will be described hereinbelow, the certification pattern will not be added to image data for private business but is added to the image data shared by multiple users. That is, the data of an image with this certification pattern added does not need to be reduced and stored because it should be authorized use of digital copier 1.

When no certification pattern has been detected from the image data (Step S11, undetected) until this image reduction iscompleted (Step S13, completed), print image storage manager 14b stores the reduced image data associated with the ID code of the ID card into storage 15 (Step S14).

Next, when an order of copying is given through input control portion 16 (Step S4, given) and color image copying is designated (Step S5, Yes), mode portion 14c gives notice of performing a copying operation of a color image to print image storage manager 14b, image reader 11, image processor 12 and image forming portion 13.

In response to this, image reader 11 reads the image of the original and outputs the image data representing the color image. This image data is processed through image processor 12 and then supplied to image forming portion 13, where the color image is reproduced on recording paper.

Image processor 12 outputs the image data also to print image storage manager 14b of controller 14. Further, specified pattern detector 12a of image processor 12 tries to detect the certification pattern from the image data.

Figure 5:
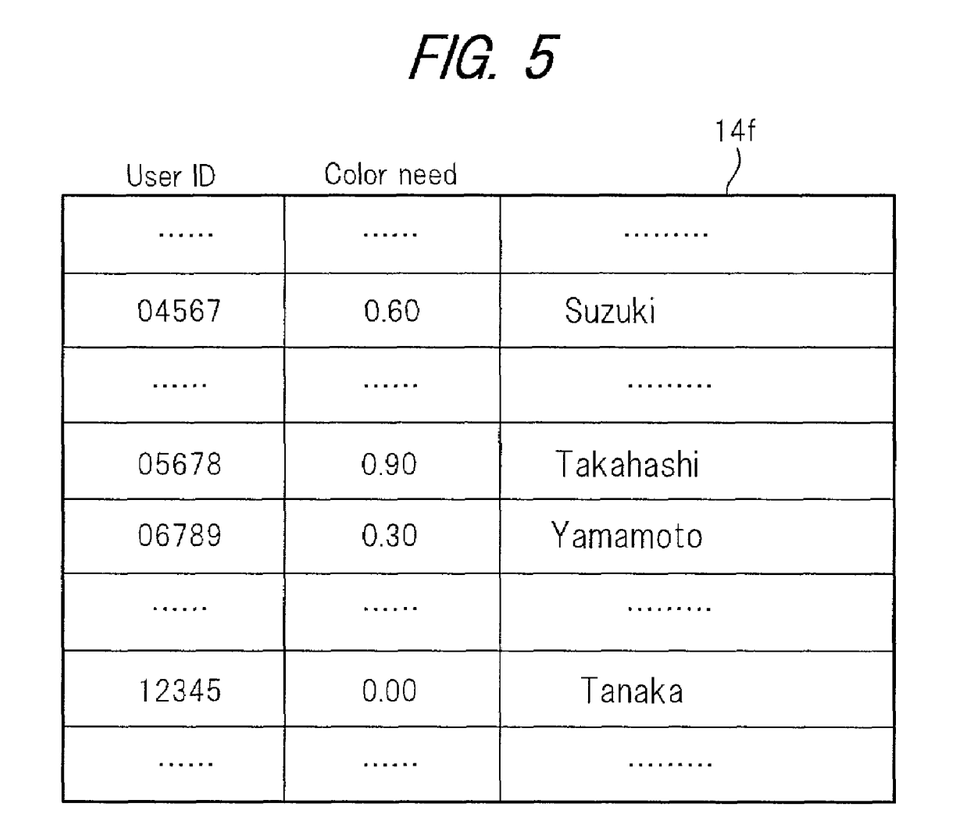
FIG. 5 is a chart showing user data table in the system of the embodiment.

Storage judgement portion 14d of print image storage manager 14b, in response to being notified of a copying operation of a color image from mode portion 14c, determines a storage ratio for color imaging (Steps S6 and S7). To determine this storage ratio, storage judgement portion 14d refers to basic storage ratio data table 14e shown in FIG. 4 and a user data table 14f shown in FIG. 5. Stored in this user data table 14f are multiple user names and their need for color images in relation to user ID codes. Storage judgement portion 14d reads out the basic storage ratio for color imaging, 0.50, from basic storage ratio data table 14e, and also reads out the color need in association with the ID code of the ID card from user data table 14f and makes calculation of (1−color need)×0.50, the basic storage ratio, to determine the application storage ratio. For example, if the color need is 0.60, then the application storage ratio is determined as (1−0.60)×0.50=0.2.

Further, storage judgement portion 14d generates, at random, a random number RDN, whose values are varied in 0.01 increments within the range of 0 to 1.00 and compares the generated random number with 0.20, the application storage ratio (Step S9). If the random number RDN<the application storage ratio, 0.20 holds (Step S9, Yes), the operation is followed by the process from Step S10, in order to store the image data representing the color image. When the random number RDN<the application storage ratio, 0.20 does not hold (Step S9, No), the operation returns to Step S1 without storing the image data. As a result, the storage ratio of color images is set at 20% of all the copied color images.

When image data representing the color image is stored into memory, the image data from image processor 12 is reduced in the same manner as for monochrome images (Step S10). When specified pattern detector 12a of image processor 12 detects the certification pattern from the image data (Step S11, detected) in the course of reducing the image, the reduction process upon the image data is stopped (Step S12) because this indicates that the image data has been created for multiple users. When no certification pattern has been detected from the image data (Step S11, undetected) until this image reduction is completed (Step S13, completed), print image storage manager 14b stores the reduced image data associated with the ID code of the ID card into storage 15.

Figure 3:
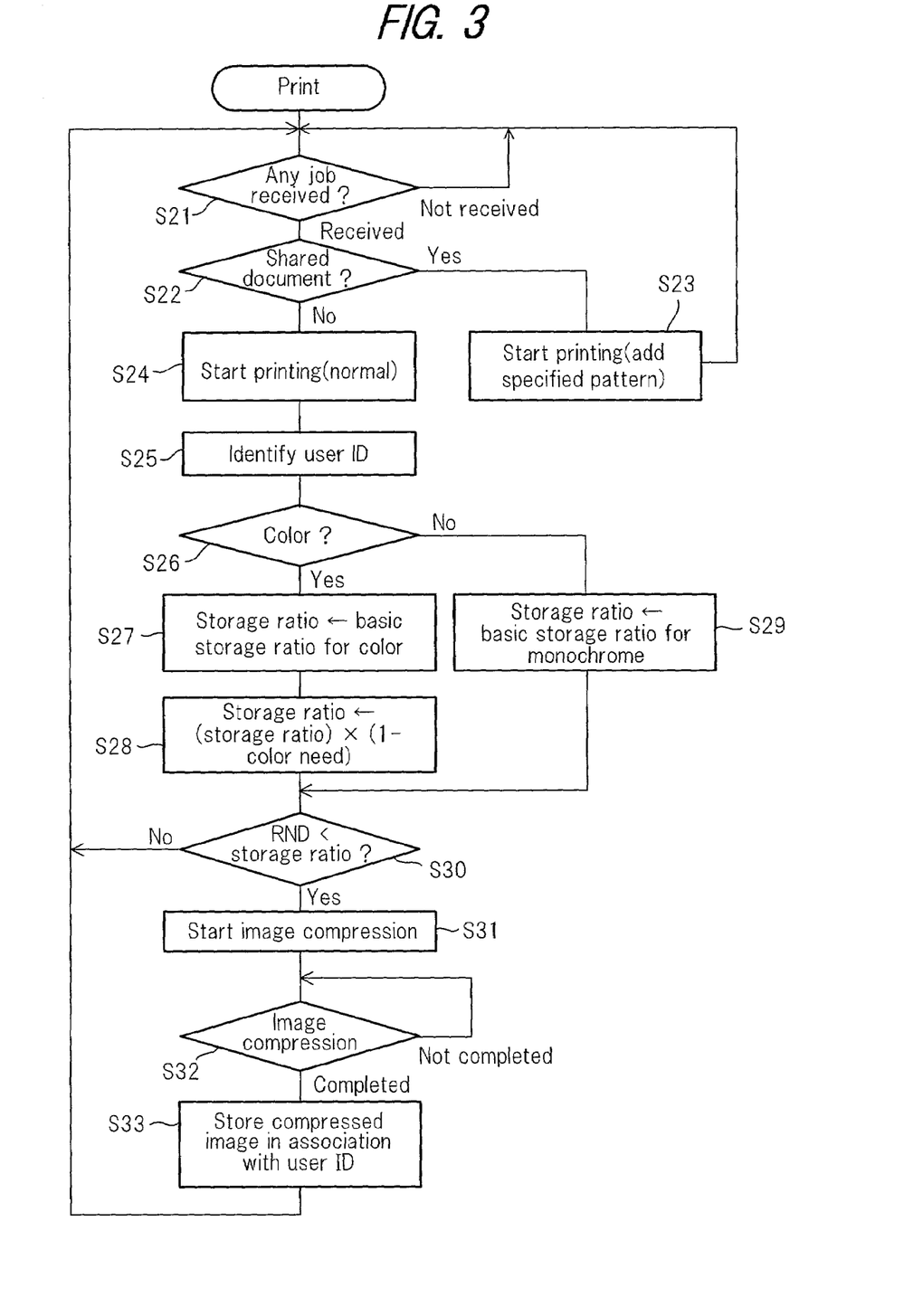
FIG. 3 is a flowchart showing the processing sequence of the system of the embodiment when the digital copier shown in FIG. 1 functions as a printer.

Next, the processing sequence of the flowchart shown in FIG. 3 when digital copier 1 functions as a printer will be described.

As stated already, digital copier 1 receives image data from first or second user terminal 2 and 3 or shared document server 4 and records the image represented by the image data. In digital copier 1, a data identifying portion 14h of controller 14 waits for reception of image data from network 5 via network I/O device 17 (Step S21, not received). Once the identifying portion has received image data (Step S21, received), it extracts the header added to this image data and reads from the header the address of the terminal which transmitted the image data. Data identifying portion 14h, then, determines whether the address belongs to shared document server 4 (Step S22). If this address belongs to shared document server 4 (Step S22, Yes), data identifying portion 14h reads the header to determine whether monochrome or color imaging is designated, and informs image processor 12 of the designation (Step S23). A specified pattern adder 14i of controller 14 adds pattern data representing a certification pattern to the image data and sends the image data to image processor 12, then the operation returns to Step S21.

This image data is processed through image processor 12 then is supplied to image forming portion 13, where either monochrome or color image is reproduced on recording paper. This recorded image has the certification pattern with it.

That is, the image data received from shared document server 4 is directly used to record its image with the certification pattern added thereto without its being stored. This is because all the images of data from shared document server 4 should be shared by multiple users so the recording of any of these images should not be unauthorized use of digital copier 1 and can be done without the need of storage of the image data.

Figure 2:
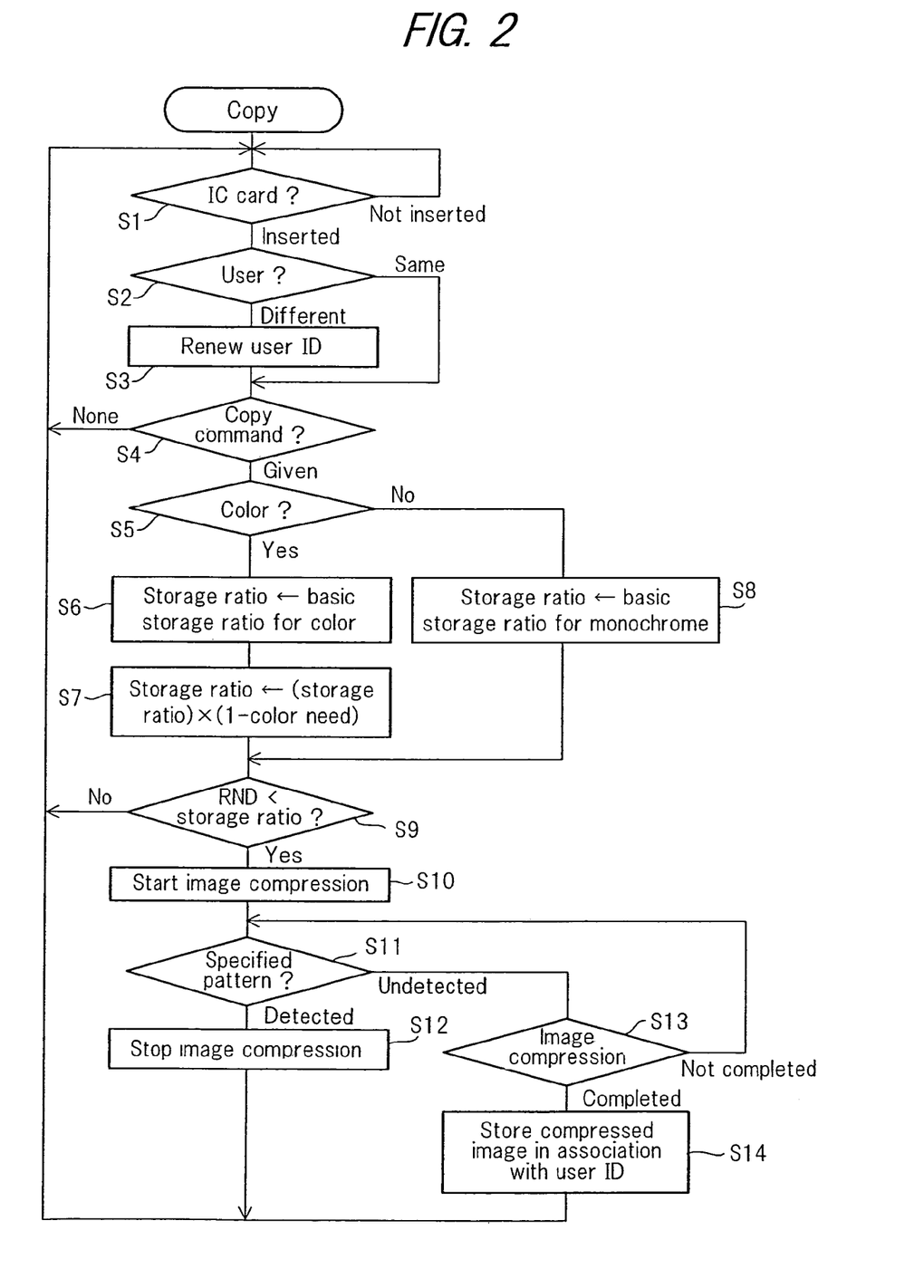
FIG. 2 is a flowchart showing the processing sequence of the system of the embodiment when the digital copier shown in FIG. 1 functions as a copier.

Here, when the image having the certification pattern with it is copied, this certification pattern will be detected at Step S11 of FIG. 2 as stated already. Therefore, no image data representing this image will be stored.

When the address read from the header does not belong to shared document server 4 (Step S22, No), data identifying portion 14h reads the header so as to determine whether a monochrome or color image is designated, and informs the designation to image processor 12 and print image storage manager 14b and transfers the image data to image processor 12 and print image storage manager 14b (Step S24). Image processor 12 processes the image data and gives it to image forming portion 13, where either a monochrome or color image represented by the image data is reproduced on recording paper.

When the address read from the header does not belong to shared document server 4, the image data should be sent from either, first or second user terminal 2 and 3. In this case, the header contains the terminal address and the user ID code of the terminal. Data identifying portion 14h reads this ID code from the header and passes it to print image storage manager 14b (Step S25).

When monochrome imaging has been designated (Step S26, No), storage judgement portion 14d of print image storage manager 14b executes the same process as the aforementioned Step S8 of FIG. 2 to determine a storage ratio for monochrome imaging (Step S29). Further, when the random number RDN<the basic storage ratio, 0.05 holds (Step S30, Yes), the operation is followed by the process from Step S31 in order to store the image data representing the monochrome image. When the random number RDN<the basic storage ratio, 0.05 does not hold (Step S30, No), the operation returns to Step S21 without storing the image data.

At Step S31, image reducing portion 14g of printing image storage manager 14b performs reduction of the image data. When the image reduction is completed (Step S32, completed), print image storage manager 14b stores the reduced image data in association with the ID code of the ID card into storage 15 (Step S33).

On the other hand, when the received image data is determined to be of a color image from its header(Step S26, Yes), storage judgement portion 14d of print image storage manager 14b executes the same process as Steps S6 and 7 of FIG. 2 to determine a storage ratio for color imaging (Steps S27 and 28). When the random number RDN<the application storage ratio, 0.20 holds (Step S30, Yes), the operation is followed by the process from Step S31 in order to store the image data representing the color image. When the random number RDN<the application storage ratio, 0.20 does not hold (Step S30, No), the operation returns to Step S21 without storing the image data.

When image data for color imaging is stored, the image data is reduced (Steps S31 and S32) and the reduced image data is stored in association with the ID code of the ID card into storage 15 (Step S33).

In this way, for use of digital copier 1, at least part of the recorded data is stored in association with the user ID code into storage 15. Therefore, it is possible to know who recorded what kind of data using the digital copier by reading the storage content of storage 15. That is, it is possible to discern unfair use of digital copier 1 so as to inhibit this.

In the above embodiment, a distinction is made between monochrome imaging and color imaging. That is, for monochrome imaging, image data is stored in association with user ID codes at a 5% possibility while for color imaging, image data is stored in association with user ID codes at possibilities ranging from 0 to 50% depending upon the users. Generally, color image recording is expensive compared to monochrome image recording. This is why color images are adapted to be stored at higher possibilities than monochrome images so as to monitor color image recording more closely.

It is possible to specify the users who need to use color image recording. For example, in an office, users engaged in accounting work or the like have little chance to use color image recording whereas users engaged in planning, designing or the like have much higher chance of using color image recording. This is why each color image is stored at an application storage ratio which is determined depending on the user by reading out the basic storage ratio for color imaging, 0.50, from basic storage ratio data table 14e shown in FIG. 4 and reading out the color need for the user in user data table 14f shown in FIG. 5 and making the calculation of (1−color need)×0.50, the basic storage ratio.

In this way, selective storage of image data makes it possible to reduce the amount of data to be stored hence the storage capacity of storage 15 and facilities the management task of discerning unfair usage of digital copier 1 by reading out the content of storage 15. Further, if the storage ratio of image data is simply lowered, prevention against unfair used maybe reduced. However, in the present invention, since basic storage ratios are separately set for monochrome imaging and color imaging and since for color imaging the basic storage ratio and application storage ratio based on the color need are given in different weights, it is possible to improve prevention against unfair use with a reduced storage ratio of image data.

Further, since image data is reduced and then stored, the amount of data to be stored can be lowered, thus facilitating the management tasks of discerning unfair use.

Moreover, when the certification pattern is detected from image data shared by multiple users, this image data will not be stored. The image data shared by multiple users from shared document server 4 is not stored. These features also reduce the amount of data to be stored, thus facilitating the management tasks of discerning unfair use.

Alternatively, if some image data needs to be kept confidential, the image data should not be stored without permission. In such a case, if the certification pattern is added to the image data, the image data will not be seen by the management operator who does not necessarily have the right to see the content of the image data. Further, if priority should be given to confidentiality, a special pattern may be allotted for confidentiality. In this case, it is possible to perform a manipulation so that the image data with this pattern added is not stored when this pattern is detected.

It is preferred that such a pattern be rendered with colors and shapes unlikely to be visually recognized on the recording paper.

Figure 6:
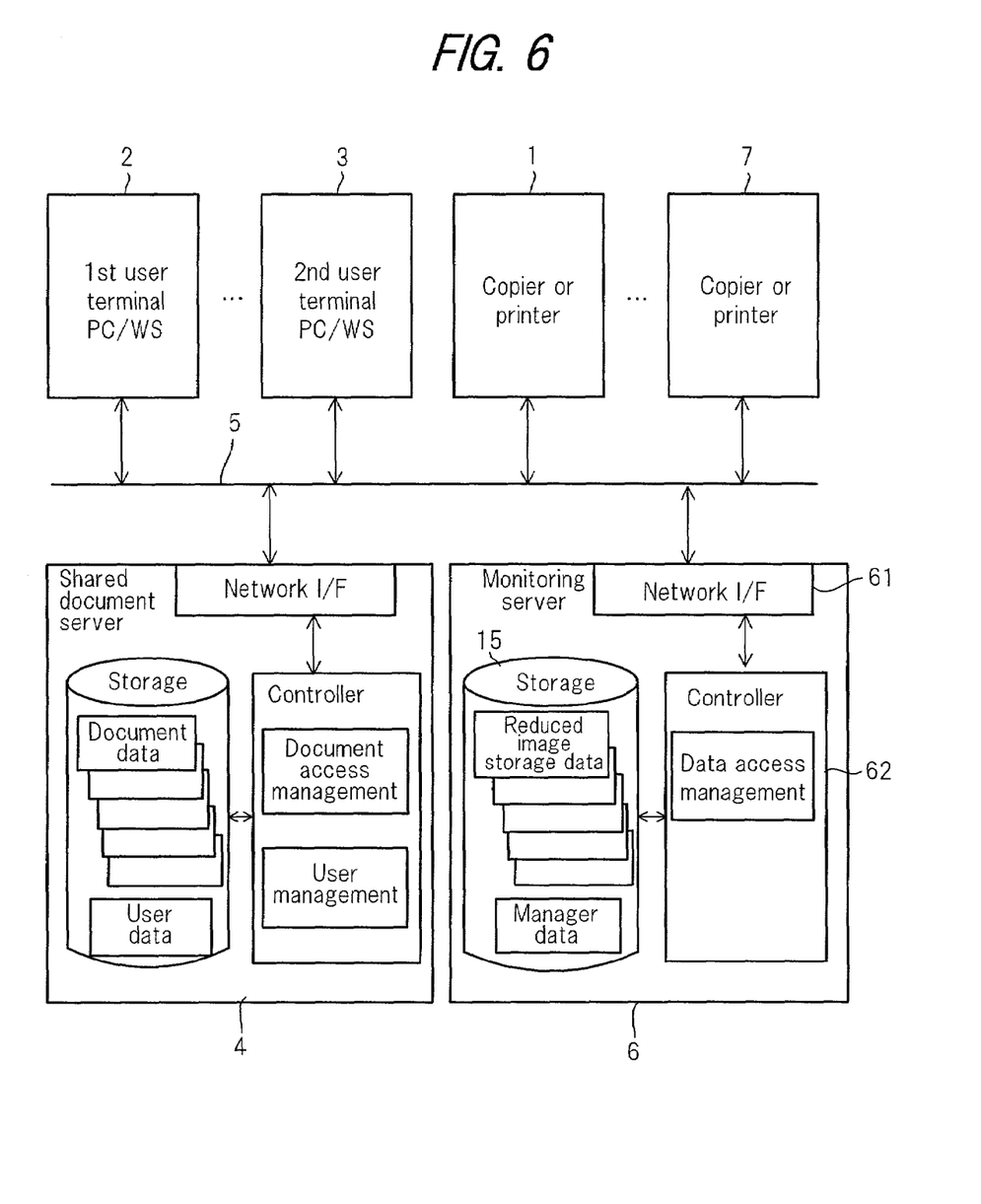
FIG. 6 is a block diagram showing a network system to which a variational example of the system of the embodiment is applied.

In the above network system shown in FIG. 1, each piece of image data is stored in association with its ID code in storage 15 of digital copier 1. However, it is possible to provide a dedicated monitoring server 6, as shown in FIG. 6, in which storage 15 may be included. In monitoring server 6, a network I/O device 61 receives image data together with its ID code from digital copier 1 through network 5 and passes it to a controller 62. Controller 62 stores the image data in association with the ID code into storage 15. In the network system shown in FIG. 6, digital copier 7 and the like other than digital copier 1 are connected to network 5, each of these digital copiers 1 and 7 functions as a copier and printer. Therefore, if image data with ID codes are stored separately for each of digital copiers 1 and 7, the management work of grasping unfair usage would become complicated. However, it is possible to avoid the management work becoming complicated by storing all the image data to be stored together with their ID codes en bloc into storage 15 of monitoring server 6 while letting each of digital copiers 1 and 7 only set image data and their ID codes.

It should be noted that the present invention is not limited to the above embodiments but various modification can be made. In the above embodiment, the storage ratio of image data is set depending on the imaging type, i.e., monochrome imaging or color imaging or depending on the user. However, the storage ratio of image data may be set, for example, with respect to each terminal or with respect to the type of image data (text, patterns, photograph, etc.). Alternatively, a fixed storage ratio may be applied to all image data. It is also possible to set the storage ratio of image data depending on the day of the week or time zone.

As has been described, according to the present invention, at least part of recorded data is stored in association with user ID codes into the storage means. Therefore, it is possible to know who recorded what kind of data by reading out the stored content from the storage means, thus making it possible to discern unfair use of the image forming apparatus and inhibit this.

According to another aspect of the present invention, the image forming apparatus has an ID code identifying means. That is, if there are a multiple number of image forming apparatus, each machine has its own ID code identifying means while the storage means may be provided for a single monitoring server to which each image forming apparatus is connected via a network. Therefore, if data is recorded by any of the image forming apparatus, at least part of the recorded data is stored in association with its ID code into the monitoring server by data transfer between each image forming apparatus and the monitoring server.

Further, according to the present invention, since the data is compressed and then stored into the storage means, it is possible to reduce the storage capacity of the storage means. For data compression, reduction, thinning or the like can be used.

According to the present invention, a judgement means which determines whether at least part of data should be stored or not is further included, so as to store at least part of the data in association with the ID code into the storage means only when the judgment means concludes the necessity of storage. This makes it possible to reduce the amount of data to be stored into the storage means and hence enables use of a reduced capacity of storage means, which makes easier the management of storage content in the storage means.

According to a further aspect of the present invention, judgement as to whether at least part of data is stored is made by making a distinction between monochrome data and color data. Since the cost for recording color data onto recording paper is higher than that for monochrome data, the storage ratio for color imaging is set higher than that for monochrome imaging. That is, color images are adapted to be stored into the storage means at higher possibilities than monochrome images so as to discern unfair use of the image forming apparatus more closely as to color image recording.

According to the present invention, it is judged whether at least part of data should be recorded for each ID code or each user. As the storage ratio depending on the ID code becomes higher, the possibility that the data is stored into the storage means becomes higher hence the criterion for monitoring unfair use of the image forming apparatus becomes more severe.

According to another aspect of the present invention, the data shared by multiple users is assumed to be not private and will not be stored. This makes it possible to reduce the amount of data to be stored into the storage means, and hence enables use of a reduced capacity of storage means, which makes easier the management of storage content in the storage means.

Finally, according to the present invention, official data is added with a predetermined pattern so as to avoid the official data being stored. This reduces the amount of data to be stored into the storage.

What is claimed is:

1. An unauthorized usage monitoring system for image forming apparatus, comprising:

identifying means which, when image data specified by a user is recorded onto recording paper by an image forming apparatus, identifies an ID code of a user who requested the recordation of the specified image data;

pattern detecting means for detecting a preset pattern attached to the specified image data such that if said predetermined pattern is detected none of said specified image data is stored;

judgment means for determining when said preset pattern is not attached to the specified data whether a portion of the specified image data should be stored or not ,and if a portion of the specified image data is to be stored, the content of the portion of the specified image data to be stored, according to the nature and/or characteristics of said specified image data, and storage means for storing only said content of said portion of the specified image data in association with the ID code identified by the identifying means and otherwise not storing any of said specified image data, wherein only when the judgment means has determined that a portion of the specified image data should be stored and the content of the portion of the specified image data to be stored, only said portion of the specified image data is stored in association with the ID code of the user in the storage means, wherein the image forming apparatus records onto recording paper all of the specified image data transferred to the image forming apparatus from a network through a user terminal or shared document server connected thereto.

2. The unauthorized usage monitoring system for image forming apparatus according to claim 1, wherein said identifying means is provided at at least one said image forming apparatus and said storage means is provided at a monitoring server connected with said image forming apparatus via the network.

3. The unauthorized usage monitoring system for image forming apparatus according to claim 1, wherein the specified image data recorded on said recording paper is compressed and only the portion of the compressed specified image data determined by the judgment means is stored in the storage means.

4. The unauthorized usage monitoring system for image forming apparatus according to claim 1, wherein when the specified image data is for color imaging, the judgment means determines whether a portion of the color data should be stored or not and the content of the portion of said specified image data to be stored by comparing a random number with a predetermined storage ratio for color imaging, and when the specified image data is for monochrome imaging, the judgment means determines whether a portion of the monochrome data should be stored or not and the content of the portion of said specified image data to be stored by comparing a random number with a predetermined storage ratio for monochrome imaging.

5. The unauthorized usage monitoring system for image forming apparatus according to claim 1, wherein the judgment means holds multiple storage ratios in association with multiple ID codes, selects one storage ratio corresponding to the ID code which has been identified by the identifying means and determines whether a portion of the specified image data should be stored and the content of the portion of the specified image data to be stored, based on the selected storage ratio.

6. The unauthorized usage monitoring system for image forming apparatus according to claim 1, further comprising:

determining means for determining whether said specified image data is shared by multiple users, wherein specified image data which has been determined by the determining means to be shared by multiple users will not be stored.

* * * * *